June 18, 1946.   A. F. HICKMAN   2,402,161
SPRING SUSPENSION FOR RAILROAD CARS
Filed Jan. 23, 1943   2 Sheets-Sheet 2
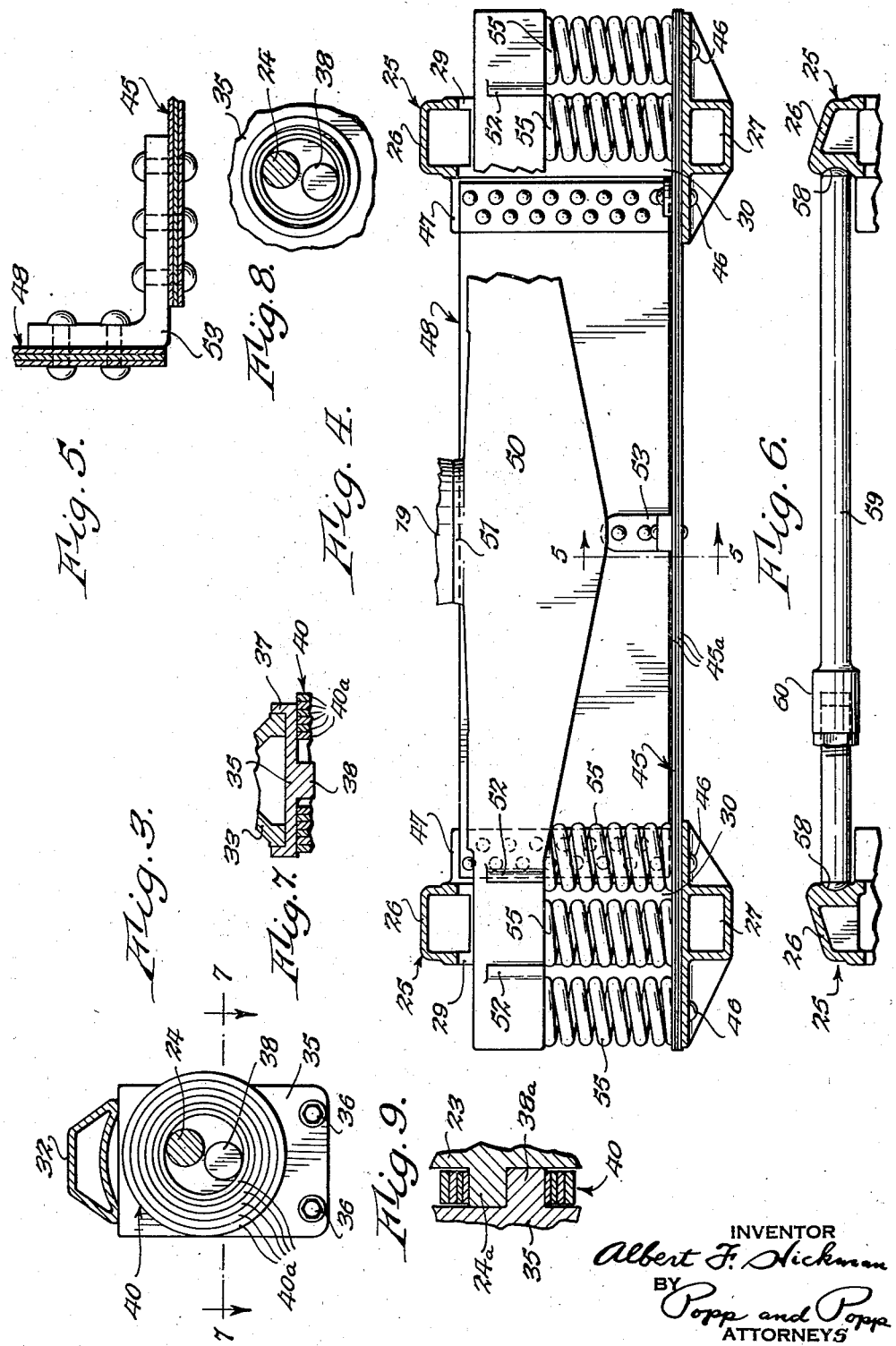
INVENTOR
Albert F. Hickman
BY
Popp and Popp
ATTORNEYS Patented June 18, 1946

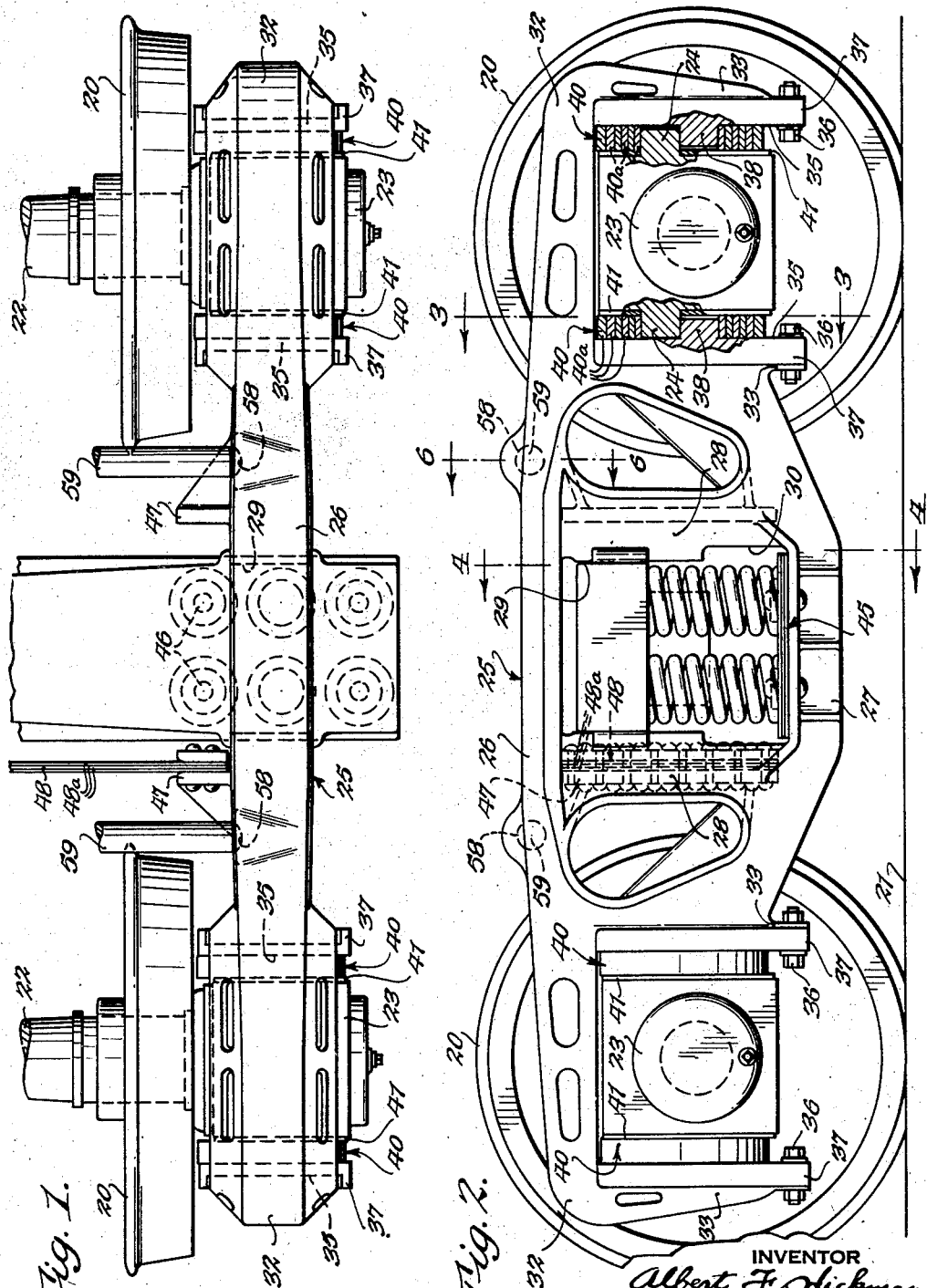

2,402,161

UNITED STATES PATENT OFFICE 2,402,161

SPRING SUSPENSION FOR RAILROAD CARS

Albert F. Hickman, Eden, N. Y., assignor to Hickman Pneumatic Seat Co. Inc., Eden, N. Y., a corporation of New York Application January 23, 1943, Serial No. 473,348

14 Claims. (Cl. 105—222)

This invention relates to a spring suspension for railroad cars and is more particularly shown as embodied in the truck of a freight car, although features of the invention are equally applicable to passenger car spring suspensions as more particularly set forth in my copending application, Serial No. 473,824, filed January 28, 1943.

One of the principal objects of the invention is to provide a spring suspension which will function to safely support the car body at high speeds, higher speeds being demanded of both passenger and freight trains.

Another object of the invention is to employ conventional truck construction, particularly in the use of journal boxes, truck side frames, bolsters, planks and helical bolster springs as now are employed in conventional railroad truck constructions.

Another object is to provide such a spring suspension which provides for the lateral cushioning of the car body as well as its vertical cushioning thereby to absorb lateral impacts imposed upon the car body as well as vertical impacts.

Another object is to provide a railroad truck having such a spring suspension in which all parts are well within the limits of size and movement required by present railroad standards.

Another object of the invention is to provide such a spring suspension which has the necessary features of safety both against breakage and also to insure the car being solidly supported on the tracks at all rail speeds.

Another object is to provide such a spring suspension which provides the necessary stability and also provides the desired riding qualities.

Another object is to provide a truck and spring suspension for railroad cars which is light in weight and also is adapted to be used in conjunction with lightweight bodies and equipment, such lightweight bodies and equipment being desirable with the use of increased rail speeds.

Another object of the invention is to provide such a suspension which will support the car body in such manner as to permit a minimum side sway even with the high centers of gravity of conventional bodies.

Another object of the invention is to provide such a spring suspension having many operating economies, such as the saving in fuel; the saving in wear of the tracks and the wheels; and the saving in maintenance of the car bodies, trucks and spring suspensions.

Another object is to provide such a suspension in which the friction in the spring suspension can be reduced to any desired degree, and in which the stress upon the springs is held low enough to insure long life and freedom from the danger of breakage.

Another object is to provide such a spring suspension in which each entire axle assembly can be readily removed as a unit.

Another object of the invention is to reduce to a minimum the unspring weight of the suspension.

Another object of the invention is to provide such a suspension which eliminates wheel hop and wheel tramp.

Another object of the invention is to provide an extremely simple and effective method of securing lateral cushioning, this comprising the insertion of ring springs between the journal boxes and the pedestal legs of the truck side frame members.

Another object is to provide such a lateral cushioning means which does not require lubrication.

Another object is to provide such a lateral cushioning means in which any desired spring characteristics, such as variable rate springing, can be obtained by the design of the ring springs.

Other advantages and objects of the invention will be readily apparent from the following description and the accompanying drawings, wherein:

Fig. 1 is a fragmentary top plan view of a truck for a railroad car body embodying my invention.

Fig. 2 is a side elevation thereof, with portions of the truck broken away.

Fig. 3 is a vertical transverse section, taken on line 3—3, Fig. 2.

Fig. 4 is a fragmentary vertical transverse section, taken on line 4—4, Fig. 2.

Fig. 5 is an enlarged fragmentary vertical section, taken on line 5—5, Fig. 4.

Fig. 6 is a fragmentary, vertical, transverse section, taken on line 6—6, Fig. 2.

Fig. 7 is a fragmentary horizontal section through one pedestal leg, this section being taken on line 7—7, Fig. 3.

Fig. 8 is a vertical section, similar to Fig. 3, of a modified form of ring spring assembly which can be used in conjunction with the spring suspension.

Fig. 9 is a fragmentary view similar to Fig. 2 showing a modified form of the ring spring connection between the journal box and pedestal legs.

In the form of the invention shown in Figs.

1-7 the invention is shown as embodied in a four wheel truck particularly designed for supporting a freight car body indicated generally at 19, although it will be understood that features of the invention can be employed in conjunction with six wheel trucks and can be employed in trucks designed for passenger car service, particularly the means shown whereby lateral cushioning of the truck frame is achieved through the use of ring springs between the journal boxes for the axles and the pedestal legs of the truck side frames.

The flanged railroad wheels 20 are shown as riding on the rails 21 of the track and as being fast to axles 22 of standard construction. The ends of the axles project beyond the wheels 20 and are journaled in journal boxes 23 of any usual and well known construction, a feature of the invention residing in the provision of horizontal pivot lugs or bosses 24 projecting forwardly and rearwardly from the front and rear walls, respectively, of the journal boxes and which connect, through ring springs, as hereinafter described, with the pedestal legs of the truck side frames to provide both lateral and vertical cushioning of the impacts between the axles and the trucks.

These truck side frames, indicated generally at 25, are shown as made of a single steel casting, although it will be understood that they could be of fabricated construction and each is formed to provide an upper bar 26, a lower bar 27 and bolster guide columns 28 which form a top bolster opening 29 and a lower bolster opening 30, the lower bolster opening being wider than the upper bolster opening.

Each of the truck side frames 25 is formed at its ends to provide a pedestal 32 having a pair of pedestal legs 33 which form a pedestal jaw in which the corresponding journal box 23 is arranged. As best shown in Figs. 2, 3 and 7, a plate 35 is secured by a pair of bolts 36 to the inner face of each of these legs 33, these plates being held against lateral displacement by side flanges 37 which embrace the pedestal legs and the bolts 36 preventing the plates from sliding downwardly but permitting them to be removed. These plates are formed to provide opposed pivot bosses or lugs 38 which are preferably about the same size as the pivot bosses 24 and arranged under and immediately adjacent thereto. As best shown in Fig. 3, in the normal loaded condition of the freight car, the axis of the pedestal pivots 38 is arranged in a vertical plane disposed outside of the vertical plane intersecting the axes of the corresponding journal box pivots 24. By this arrangement the line or plane of pressure between these pivots extends upwardly and inwardly from the pedestal pivots 38 to the axle or journal box pivots 24.

For this purpose each companion pair of these pedestal and axle or journal box pivots 38 and 24 is connected by a shackle or ring spring assembly 40 composed of a plurality of nested endless springs 40a. Each of these groups 40 of springs is essentially a shackle connecting each axle or journal box pivot 24 with the corresponding pedestal pivot 38 and extending upwardly and inwardly from the pedestal pivot 38 to the axle pivot 24. However, while slanting rigid shackles having full bearing with these pivots could be provided, it is highly desirable that they be in the form of springs to act as cushions against both vertical and lateral impacts between the axle and the truck frame and thereby reduce the unsprung weight of the car to the wheels, axles and journal boxes, as well as to provide a yielding resistance to sledge hammer blows or violent impacts directly at the axle and eliminating the transmission of such violent impacts through the truck frame to the bolster springs. Further, for reasons of economy, it is desirable that these shackles be in the form of cylindrical bodies of spring steel which can be readily produced by cutting sections from spring steel tubing of progressively smaller diameter, heat treating the cut sections, and nesting the sections together. These sections are cut to fit the space between each plate 35 and a wear plate 41 which is fitted over the corresponding axle or journal box pivot 24 and against the face of the journal box so as to provide a readily replaceable wearing unit against which the ends of the ring springs 40 oscillate. The plates 35 against which the opposite ends of the ring springs oscillate are also, of course, readily replaceable should wear take place to an extent which would permit an excessive movement of the axles and their journal boxes lengthwise of the car body.

Such nested ring springs serve the requirements of supporting loads of practically any size on pivots, such as the pivots 24 and 38, which move relative to each other without rotation about their axes. This type of ring spring shackle accommodates variable loads and horizontal as well as vertical movements of the pivots and since the contact between the two pivots and the ring springs is inherently a rolling contact, there is no need for lubrication, this being an important feature of the invention.

The desired amount of vertical deflection of the ring springs 40 is determined by the number of the rings, the circumferential size of the rings, and the thickness of the rings. The capacity of the ring springs within given stress limits is determined by the thickness and circumference of the rings, the number of rings and the width of the rings. Thus the character of ring springs required for any particular condition can be very readily calculated.

Because of the increasing circumferential size of each ring spring over the next preceding inner spring, it is desirable to use thicker rings for the outer rings than are used for the inner rings. By using heavier outer rings the stresses can be kept uniform on all of the leaves or units of the ring spring and this in turn lends for the maximum capacity and efficiency with the minimum amount of material and minimum size of the nested ring springs. Also, by using thinner inside leaves the concentrated pivot loads are carried outwardly from the pivots by each additional leaf and the load is distributed over a larger circumferential extent of the outer leaves. These outer leaves can therefore be made thicker in proportion to their circumference.

It will also be appreciated that with such a nested series of ring springs, variable capacities and deflections can be produced by increasing or decreasing the diameters of the individual rings in relation to one another and by increasing or decreasing the width or thickness of the individual rings in relation to one another. Further, regardless of the number of springs so nested and regardless of the degree of springing provided by individual leaves, the friction between the leaves, in action, is practically zero. This is because if the leaves are of a maximum size to permit them to be easily slipped over one another, when the load is applied the spring leaves press against each other at the pivot positions but not on the sides of the leaves.

If a variable rate spring is desired, all that is necessary is to make one or more of the outer rings or leaves more or less loose on the inner rings so that the inner rings carry all of the load up to a predetermined point at which point one or more of the outer rings come into service. Such a shackle or ring spring assembly is illustrated in Fig. 8.

If a ring spring assembly is desired which will readily flex up to a given load and then become springless or very stiff, a very heavy outer ring, also as illustrated in Fig. 8, can be used which acts as a stop when the inner ring springs are deflected to a predetermined point. This type of heavy outer ring spring can also be used as a safety device to prevent overstressing of the inner leaves.

The truck is of the rigid bolster type in which the bolster springs are supported at the ends of a plank indicated generally at 45. This plank is, however, composed of a plurality of sheet metal laminations 45a which are arranged horizontally one on top of the other. The ends of this laminated plank rest on the lower bars 27 of the truck side frames within the bottom bolster openings 30 and are secured thereto, as by the rivets 46. The ends of the plank 45 project beyond the side frames 25 and the rivets 46 are spaced so as to rigidly connect the two truck side frames 25 together in a horizontal plane. That is, since the plank is horizontally disposed and secured by the horizontally spaced rivets 46 to the side frames 25, the side frames are incapable of longitudinal movement relative to each other. However, since the plank 45 is made of a series of laminations, it is free to twist and hence permits either end of either side frame to rise without lifting the other corners of the truck. Since the spring planks 45 are stiff in a horizontal plane, it will also be appreciated that these laminated planks hold the truck side frames 25 in parallel relation in a horizontal plane, that is, they serve to prevent the truck side frames from toeing in or toeing out at either end of the truck. The laminated planks 45 can be assisted in this capacity by the provision of cross bars between the truck side frames which have universal connection with the side frames as hereinafter described.

It is also essential that the truck side frames 25 be held in parallel, uniformly spaced relation to each other at all times, that is, that the truck side frames be not permitted to spread out at their tops or bottoms regardless of the load imposed upon the truck. To accomplish this each of the truck side frames 25 is shown as provided along one of its bolster guide columns 28 with an inwardly projecting vertical flange 47 and to these flanges are riveted the ends of a laminated vertically disposed plate 48. As with the plank 45, the plate 48 is composed of a plurality of sheet metal laminations 48a arranged face to face, but the plate 48 is vertically disposed so as to hold the side frames 25 parallel and uniformly spaced.

The laminated plank 45 therefore prevents the side frames 25 from moving fore and aft with reference to each other and the laminated plate 48 holds the side frames 25 from spreading and in parallel vertical planes. However, by virtue of the laminated form of the plank 45 and plate 48, they can both twist so as to permit one corner of the truck to be lifted without affecting the other corners of the truck. To prevent bellying or whipping of the laminated plank 45 and plate 48, they are preferably interconnected at their centers by an angle bracket 53, as best shown in Figs. 4 and 5.

The bolster 50 is shown as being of cast steel construction having the usual center plate 51 and having the usual flat bearing surfaces which ride along the upper parts of the bolster guide columns 28. The bolster is also shown as having the usual opposed shoulders 52 which engage the sides of the bolster columns 28 to hold the bolster in centered relation to the truck and the ends of the bolster project beyond the truck side frames a distance equal to the projection of the ends of the plank 45.

Six bolster springs 55 are shown as interposed between each end of the plank 45 and the bolster 50. These bolster springs are arranged in pairs, one pair being arranged inside of the corresponding truck side frame, the next pair being arranged in the plane of the truck side frame but outside of the centerline thereof, and the outer pair being arranged outside of the truck frame. By this arrangement the load on the bolster is carried vertically to the truck side frames without tending to spread or twist them and at the same time the effective spring centers are located in the vertical planes of the truck side frames. The wide spacing of the effective spring centers imparts improved stability to the suspension and also improves side sway control.

If desired, additional spacers, other than the laminated plank 45 and laminated plate 48, can be provided between the truck side frames 25. For this purpose the side frames can be provided with opposed spherical recesses 58 in which are fitted the spherical ends of a compression bar 59. This compression bar is preferably adjustable as to length, as indicated at 60. Since these compression bars do not interfere with any movement of the truck side frames other than their inward movement it will be seen that the bars can be located anywhere without interfering with the compensating movement of the two truck side frames 25.

In the form of the invention shown in Figs. 1–7, the ring springs 40 are closely fitted in the space between the wear plates 35 and 41 and hence serve to take the thrust of the axles against the pedestal legs 33 lengthwise of the truck. A broad area of these ring springs and the replaceable wear plates is available for this purpose. However, as shown in Fig. 9, either or both of the pivots 24 or 38, as with the pivots 24a and 38a, can be made longer than the corresponding axial dimension of the ring spring assembly 40 to take this thrust instead.

In its broadest aspect the truck operates in the same manner as a conventional rigid bolster truck, that is, the load of the car body on the center plate 51 is transmitted to the bolster 50 and from there through the bolster springs 55 to the plank 45 and to the truck side frames 25 of the truck. From the truck side frames the load is transmitted through the journal boxes 23 to the axles 22 and wheels 20. Vertical impacts are absorbed by the bolster springs 55, the bolster being free to move vertically in the bolster opening 29 for this purpose.

In accordance with the invention, however, the axles are each permitted to move laterally of the truck frame by virtue of the shackle or ring spring assemblies 40 which connect the journal boxes 23 with the pedestal legs 33. As previously pointed out, and as shown in Fig. 3, in the normal loaded position of the car the line of pressure between each axle or journal box pivot 24 and the pedestal pivot 38, that is, the line or plane intersecting the axes of these pivots, inclines upwardly and inwardly from each pedestal pivot 38 to the axle or journal box pivot 24.

In providing lateral cushioning for the independent movement of the axle transversely of the track, this arrangement has two distinct advantages. One effect of this upward and inward slant of the line of pressure between each pair of pedestal pivots 38 and axle or journal box pivots 24 is that it causes the truck, and hence the car body, to always tend to centralize itself. This centralizing tendency is caused by the effect of gravity which may be considered as a resilient, downwardly acting force acting between the car body and the track bed and operating in a manner identical in its effects to a metal spring connecting the body and the track bed. It is to be distinctly understood that this force tending to centralize the truck and the corresponding end of the car body is of a resilient nature. Because of this fact the trucks and hence the corresponding end of the car body is not subjected to directly connected lateral forces as a consequence of a lateral axle movement. Such lateral axle movement occurs, for instance, in traversing curves in the track.

In the conventional spring suspension all movements of the axle with respect to the car body as a whole are transmitted directly to the truck and car body. Because of the relatively large inertia of the car body, no appreciable lateral movement actually occurs when such a conventional vehicle is traveling at high speeds. What does occur is that the car body is subjected to a sharp lateral rap of considerable force every time the axle moves in a manner other than translationally. This not only impairs the riding qualities of the vehicle, but also subjects the car body to a succession of forces which in a short period of time loosen body bolts and other such fastenings and cause the whole car body to rattle. Further, the provision of lateral cushioning of the lateral axle movement results in reduced power consumption, the positive resistance, directly by the entire car body, of lateral forces in conventional spring suspensions involving, of course, a loss of power.

While rail cars do not have the high vehicle wheel movements caused by rough roads, heavy lateral thrusts do develop when traveling on rails, due to many other causes. By the provision of the shackle or ring spring structure 40, it will be apparent that all lateral thrusts directed against the axle and wheel assembly are resiliently resisted, except those resulting directly from the weight of the axle, wheels and journal boxes. In other words, when a train hits a curve at high speed, the weight of the car body will not produce a hammer-like blow against the wheels when the wheels are suddenly caused to move laterally. The wheels will start to move laterally and when the resiliently applied lateral pressure builds up high enough to move the car body laterally, the car body is moved as a result of a resilient force and not that of a hammer blow.

Another important advantage obtained by the angular arrangement of the line of pressure between the pedestal pivots 38 and the axle or journal box pivots 24 is that it greatly reduces the possibility of wheel tramp. This latter may be broadly defined as a periodic vibration of the axle in a vertical transverse plane, the definition being usually limited to a rotary movement about an axis of rotation located at some remote point in the axle. In general, it may be said, if one wheel is lifted and if this movement causes a downward thrust on the opposite wheel, then wheel tramp results. Such wheel tramp is prevented in the present invention by insuring that the downward thrust of each axle or journal box pivot 24 lies at or outside of the vertical plane intersecting the contact of the adjacent wheel with the track. By arranging the axle or journal box pivots and the pedestal pivots so that the downward thrust of the axle pivot 24 lies at or outside of the vertical plane intersecting the contact of the wheel with the track, the vertical upward thrust against one wheel is opposed by a directly opposite force passing through the corresponding axle or journal box pivot 24 and hence no downward thrust is imposed upon the opposite wheel as occurs in the conventional spring suspension.

It will further be noted that by shackling each axle or journal box pivot 24 with the companion pedestal pivot 38 with the ring spring 40, as shown, the load is applied directly over the center of the wheel bearigs. Further, the upward and inward slant of the line of force between the pivots 38 and 24 produces an anti-side sway condition as well as adding to the stability of the entire truck and car body. This anti-side sway result is rendered effective when any side thrust is produced by the car body and truck in rounding curves or otherwise. When such side thrust causes the car and truck frame to move outward against the wheel and axle assembly it becomes necessary for the pedestal pivots 38 to move outward. In order to do this they are required to move upward against the added side sway or centrifugal forces. This upward movement is yieldingly resisted and cushioned by the ring springs 40. In passenger car trucks having soft bolster springs, the ring springs 40 are preferably made very sensitive but very limited in their range of deflection. On freight trucks with stiffer bolster springs, these ring springs 40 can be made stiffer in springing the empty cars.

While lateral cushioning could be achieved with the use of rigid shackles, that is, a shackle in the form of a rigid link having full bearing with the pivots 24 and 38, it is highly desirable to make these shackles in the form of spring shackles and it is further desirable to make these shackles in the form of the nested ring springs 40a, as shown.

These ring springs supply a resilient connection between the journal boxes and the pedestal legs of the truck side frames which yieldingly resist both vertical and also lateral impacts. These springs therefore reduce the unsprung weight of the suspension to the wheels, axles and journal boxes themselves and are particularly effective in absorbing violent impacts and preventing these impacts from being carried through to the truck frame. By making these shackles 40 in the form of nested ring springs 40a, a pure rolling contact is obtained between the ring spring assemblies and the pivots 24 and 38 and also friction between the leaves is eliminated because the clearance between the leaves permits only contact along the line of pressure intersecting the axes of the pivots 24 and 38. Further, as previously stated, a spring having any desired characteristics, such as the variable rate spring shown in Fig. 8 can be obtained by the proper design.

The axles are kept in position longitudinally of the truck simply by fabricating the ring springs wide enough to fill the space with reasonable tolerances, between the wear plates 35 and 41 arranged against the sides of the journal boxes and the pedestal legs. The impacts of the axles lengthwise of the track will therefore be spread over the entire side faces of the ring springs 40a which side faces are more than ample to meet these requirements without lubrication. Alternately, as shown in Fig. 9, the pivots 24 and 38 can be lengthened to take this thrust.

While the ring springs 40, through their lateral and vertical resiliency, reduce the unsprung portion of the truck to the axles, journal boxes and wheels, it is not desirable to make these ring springs flexible enough to provide sufficient vertical wheel and axle movement as to permit the use of an entirely rigid truck frame. However, the lateral cushioning and vertical cushioning provided by these ring springs 40 permits of obtaining axle compensation through truck frame flexibility.

It will be noted that in the present suspension, the means whereby resilience is effected does not involve any frictional resistance, such as occurs in the case of a conventional leaf spring and hence is free and non-energy absorbing in its action. Further, the spring suspension is free from the necessity of lubrication and hence the frictional resistance does not vary because of change of frictional resistance, through the character of the lubrication as in the case of a conventional leaf spring. It will also be noted that weather conditions, dirt, wear and rusting will have a minimum effect upon the proper operation of this suspension.

From the foregoing it will be seen that the present invention provides lateral cushioning between the axles and the truck frame in a simple and direct manner and also provides yielding resilience between the journal boxes and the pedestal legs so as to reduce the unsprung weight of the suspension to a minimum and also so as to permit of the use of a flexible truck through the flexibility of which axle compensation is obtained. The suspension embodying the invention is particularly desirable at high speeds in securing the proper ride characteristics and at the same time obtaining the necessary stability for high speed travel. It will further be seen that the present invention provides a suspension which is light in weight and which will function to provide these improved ride characteristics with little attention or danger of breakdown.

By "substantially contiguous" as used in the accompanying claims is meant the relation between the pivots 24 and 38 almost touching so that their centers are arranged in very close relation to each other. By this relation a very slight lateral movement of these pivots relative to each other causes a pronounced change in angularity of the plane intersecting the axes of these pivots at each side of the vehicle, thereby to provide an instantaneously acting self-centering action for the car body.

I claim as my invention:

1. In a railroad truck, a wheeled axle, a horizontal pivot extending transversely of the axle and maintained in substantially fixed relation to the axis thereof, a truck frame having a pivot arranged generally parallel and substantially contiguous with and below said first pivot and in a horizontal plane intersecting said axle and maintained in substantially fixed relation to said truck frame, and a short shackle connecting said pivots and permitting a limited movement of said axle laterally of said truck frame, the short length of said shackle providing a substantial angular movement thereof to center said axle relative to said truck frame.

2. In a railroad truck, a wheeled axle, a horizontal pivot at each end each extending transversely of the axle and maintained in substantially fixed relation to the axis thereof, a truck frame having a pivot arranged parallel and substantially contiguous with and below each of said first pivots and with its axis in substantially horizontal alinement with said axle and maintained in substantially fixed relation to said truck frame, and a short shackle connecting each pair of said pivots at each end of said axle and permitting a limited movement of said axle laterally of said truck frame, the short length of said shackle providing a substantial angular movement thereof to center said axle relative to said truck frame.

3. In a railroad truck, a wheeled axle, a horizontal pivot extending transversely of the axle and maintained in substantially fixed relation to the axis thereof, a truck frame having a pivot arranged generally parallel and substantially contiguous with said first pivot and maintained in substantially fixed relation to said truck frame, and a distortable endless ring spring maintained in substantially true circular form and connecting said pivots and rolling on said pivots to provide a limited cushioned movement of said axle laterally of said truck frame and also vertically relative to said truck frame.

4. In a railroad truck, a wheeled axle, a horizontal pivot extending transversely of the axle and maintained in substantially fixed relation to the axis thereof, a truck frame having a pivot arranged generally parallel with and adjacent to said first pivot and maintained in substantially fixed relation to said truck frame, and a distortable ring spring connecting said pivots and permitting a limited cushioned movement of said axle laterally of said truck frame and also vertically relative to said truck frame, said ring spring comprising a plurality of nested cylindrical rings of different sizes proportioned to provide the desired spring operating characteristics thereof.

5. In a railroad truck, a wheeled axle, a horizontal pivot at each end each extending transversely of the axle and maintained in substantially fixed relation to the axis thereof, a truck frame having a pivot arranged parallel with and alongside each of said first pivots and maintained in substantially fixed relation to said truck frame, and an endless ring spring encircling and connecting each pair of said pivots at each end of said axle and permitting a limited cushioned movement of said axle laterally of said truck frame and also vertically relative to said truck frame, each of said endless ring springs comprising an outer relatively rigid cylindrical ring and an inner relatively flexible cylindrical ring nested within said outer ring thereby to provide variable rate springing between said truck frame and axle.

6. In a railroad truck, a wheeled axle, means providing a vertical flat face on opposite sides of said axle extending generally parallel with and maintained in substantilaly fixed relation to the axis thereof, an axle pivot pin projecting horizontally outward from each of said faces and generally perpendicular thereto, a truck frame having a vertical flat face opposing each of said flat faces on said axle and arranged generally parallel thereto, a truck frame pivot pin projecting horizontally outward from each of the vertical flat faces of said truck frame and arranged generally perpendicular thereto, and a cylindrical ring spring arranged between each pair of said opposing flat faces and embracing and connecting the corresponding pair of pivots to permit a limited cushioned movement of said axle laterally of said truck frame and also vertically relative to said truck frame, said cylindrical ring springs also spacing said opposing flat faces a predetermined distance from each other to prevent any substantial movement of said axle forwardly or rearwardly relative to said truck frame.

7. In a railroad truck, a wheeled axle, means providing a vertical flat face on opposite sides of said axle extending generally parallel with and maintained in substantially fixed relation to the axis thereof, an axle pivot pin projecting horizontally outward from each of said faces and generally perpendicular thereto, a truck frame having a vertical flat face opposing each of said flat faces on said axle and arranged generally parallel thereto, a truck frame pivot pin projecting horizontally outward from each of the vertical flat faces of said truck frame and arranged generally perpendicular thereto, and a cylindrical ring spring arranged between each pair of said opposing flat faces and embracing and connecting the corresponding pair of pivots to permit a limited cushioned movement of said axle laterally of said truck frame and also vertically relative to said truck frame, one of said pivot pins of each pair between said opposing vertical flat faces being longer than the corresponding dimension of the corresponding ring spring and spacing said opposing flat faces a predetermined distance from each other to prevent any substantial movement of said axle forwardly or rearwardly relative to said truck frame.

8. In a railroad truck, a wheeled axle, a horizontal pivot extending transversely of the axle and maintained in substantially fixed relation to the axis thereof, a truck frame having a pivot arranged generally parallel and substantially contiguous with said first pivot and in a horizontal plane intersecting said axle and maintained in substantially fixed relation to said truck frame, said pivots being so arranged that the plane intersecting the axes of said pivots extends upwardly and inwardly from said truck frame pivot to said axle pivot, and a shackle connecting said pivots and permitting a limited movement of said axle laterally of said truck frame.

9. In a railroad truck, a wheeled axle, a horizontal pivot extending transversely of the axle and maintained in substantially fixed relation to the axis thereof, a truck frame having a pivot arranged generally parallel with and adjacent to said first pivot and maintained in substantially fixed relation to said truck frame, said pivots being so arranged that the plane intersecting the axes of said pivots extends upwardly and inwardly from said truck frame pivot to said axle pivot, and an endless ring spring encircling and connecting said pivots and permitting a limited cushioned movement of said axle laterally of said truck frame and also vertically relative to said truck frame.

10. In a railroad truck, a wheeled axle, a journal box at one end of said axle, generally coaxial horizontal pivot pins projecting outwardly from the opposite sides of said journal box generally perpendicular to the axis of said axle, a truck frame having a pair of generally coaxial pivot pins arranged in opposed relation to each other and each parallel and substantially contiguous with the corresponding one of said axle pivot pins, each pair of adjacent pivot pins being so arranged that the plane intersecting the axes of said pivot pins extends upwardly and inwardly from the truck frame pivot pins to the axle pivot pins, and a resilient shackle arranged on each side of said journal box and connecting each of said pair of adjacent pivot pins and permitting a limited cushioned movement of said axle laterally of said truck frame and also vertically relative to said truck frame.

11. In a railroad truck, a wheeled axle, a journal box at one end of said axle and having generally vertical flat faces on opposite sides arranged generally parallel with the axis of said axle, a generally horizontal axle pivot pin projecting perpendicularly outward from each of said flat faces, a truck frame having a pair of opposed flat faces arranged generally parallel with and embracing the said flat faces of said journal box, a generally horizontal truck frame pivot pin projecting perpendicularly outward from each of said truck frame flat faces adjacent to said axle pivot pins, each pair of adjacent pivot pins being so arranged that the plane intersecting the axes of said pivot pins extends upwardly and inwardly from the truck frame pivot pins to said axle pivot pins, and an endless cylindrical ring spring confined in the space between each flat face of said journal box and said truck frame and encircling and connecting the corresponding pivot pins to permit a limited cushioned movement of said axle laterally of said truck frame and also vertically relative to said truck frame.

12. In a railroad truck, a wheeled axle, means providing a vertical flat face on opposite sides of said axle extending generally parallel with and maintained in substantially fixed relation to the axis thereof, an axle pivot pin projecting horizontally outward from each of said faces and generally perpendicular thereto, a truck frame having a vertical flat face opposing each of said flat faces on said axle and arranged generally parallel thereto, a truck frame pivot pin projecting horizontally outward from each of the vertical flat faces of said truck frame and arranged generally perpendicular thereto, a cylindrical ring spring arranged between each pair of said opposing flat faces and embracing and connecting the corresponding pair of pivots to permit a limited cushioned movement of said axle laterally of said truck frame and also vertically relative to said truck frame, said cylindrical ring springs also spacing said opposing flat faces a predetermined distance from each other to prevent any substantial movement of said axle forwardly or rearwardly relative to said truck frame, and means for removably connecting said axle pivot pin to said axle to permit the removal thereof transversely of its axis and means for removably connecting said truck frame pivot pin to said truck frame to permit the removal thereof transversely of its axis.

13. In a railroad truck, a wheeled axle, means providing a vertical flat face on opposite sides of said axle extending generally parallel with and maintained in substantially fixed relation to the axis thereof, an axle pivot pin projecting horizontally outward from each of said frames and generally perpendicular thereto, a truck frame having a vertical flat face opposing each of said flat faces on said axle and arranged generally parallel thereto, a truck frame pivot pin projecting horizontally outward from each of the vertical flat faces of said truck frame and arranged generally perpendicular thereto, a cylindrical ring spring arranged between each pair of said opposing flat faces and embracing and connecting the corresponding pair of pivots to permit a limited cushioned movement of said axle laterally of said truck frame and also vertically relative to said truck frame, said cylindrical ring springs also spacing said opposing flat faces a predetermined distance from each other to prevent any substantial movement of said axle forwardly or rearwardly relative to said truck frame, and means for removably connecting said axle pivot pin to said axle to permit the removal thereof transversely of its axis and comprising a wear plate removably secured to each of said flat faces of said axle and carrying the corresponding axle pivot pin and means for removably connecting said truck frame pivot pin to said truck frame to permit the removal thereof transversely of its axis and comprising a wear plate removably secured to each of said flat faces of said truck frame and carrying the corresponding truck frame pivot pin.

14. In a railroad vehicle, a body member, a truck frame adapted to support said body member, said body member and truck frame being relatively movable vertically, spring means interposed between said truck frame and body member and supporting said body member on said truck frame, a wheeled axle, an axle pivot pin projecting horizontally outward transversely from each end of said axle and maintained in substantially fixed relation to the axis thereof, a truck frame pivot pin arranged parallel with and alongside each of said axle pivot pins and maintained in substantially fixed relation to said truck frame, the normal positions of said pivot pins at each end of said axle being such that the plane intersecting the axes of said pins extends upwardly and inwardly from said truck frame pivot pin to said axle pivot pin, and a cylindrical ring spring embracing and connecting the pair of said pivot pins at each end of said axle to permit a limited cushioned movement of said axle laterally of said truck frame and also vertically relative to said truck frame.

ALBERT F. HICKMAN.